(12) United States Patent
Lee

(10) Patent No.: US 7,387,479 B1
(45) Date of Patent: Jun. 17, 2008

(54) QUICK-RELEASE TOOL HOLDER FOR ROTARY TOOLS

(76) Inventor: Trever Darnell Lee, 9381 Central Ave., Orangevale, CA (US) 95662

( * ) Notice: Subject to any disclaimer, the term of this patent is extended or adjusted under 35 U.S.C. 154(b) by 31 days.

(21) Appl. No.: 11/284,663

(22) Filed: Nov. 21, 2005

(51) Int. Cl.
*B23C 5/26* (2006.01)
*B23B 31/107* (2006.01)
(52) U.S. Cl. .......................... 409/232; 279/75; 279/80; 279/82; 279/905; 408/239 A
(58) Field of Classification Search ................ 409/234, 409/232; 408/239 A, 239 R, 240; 279/22, 279/29–30, 74–75, 80, 82, 905, 904, 906
See application file for complete search history.

(56) References Cited

U.S. PATENT DOCUMENTS

| | | | | |
|---|---|---|---|---|
| 2,491,605 | A | * | 12/1949 | Chittenden .................... 279/75 |
| 3,708,178 | A | * | 1/1973 | Lauricella .................... 279/905 |
| 5,464,229 | A | * | 11/1995 | Salpaka ........................ 279/75 |
| 6,939,213 | B2 | * | 9/2005 | Lovchik et al. ............. 409/232 |
| 2003/0178797 | A1 | * | 9/2003 | Lovchik et al. ................ 279/75 |

* cited by examiner

*Primary Examiner*—Erica E Cadugan
(74) *Attorney, Agent, or Firm*—Risto A. Rinne, Jr.

(57) ABSTRACT

An apparatus for changing cutting tool bits rapidly on milling machines, lathes, drills and other types of rotary power tools includes a first portion that is attached to the rotary power tool and retained thereto. A second portion includes the tool bit attached thereto. The second portion is inserted longitudinally toward the rotary power tool and into a bottom of the first portion after a slide has also first been longitudinally displaced in a direction toward the rotary power tool. A plurality of balls are displaced outward, the balls preferably being ball bearings, thereby permitting an upper conical taper of the second portion to bear against an inside taper of the first portion. The slide is released and urged by an inner spring in an opposite direction forcing the balls to engage with an upper edge of a circular recess provided in the second portion, thereby retaining the second portion in position. Tangs and corresponding recesses cooperate to supply torque that is applied by the rotary tool to the first portion to the second portion and to the tool bit.

9 Claims, 6 Drawing Sheets

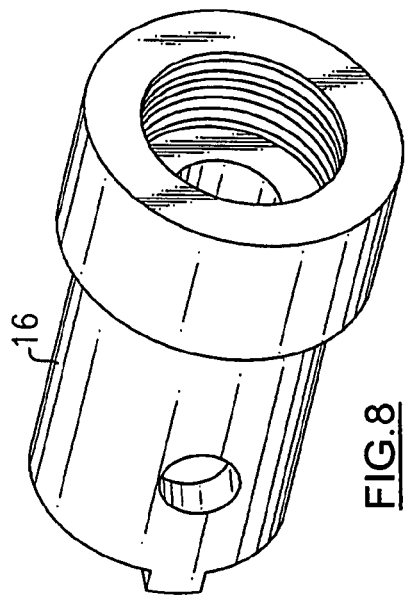
FIG.8
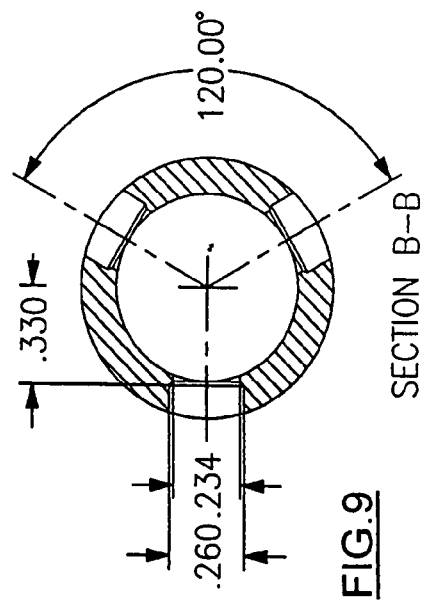
FIG.9 SECTION B-B
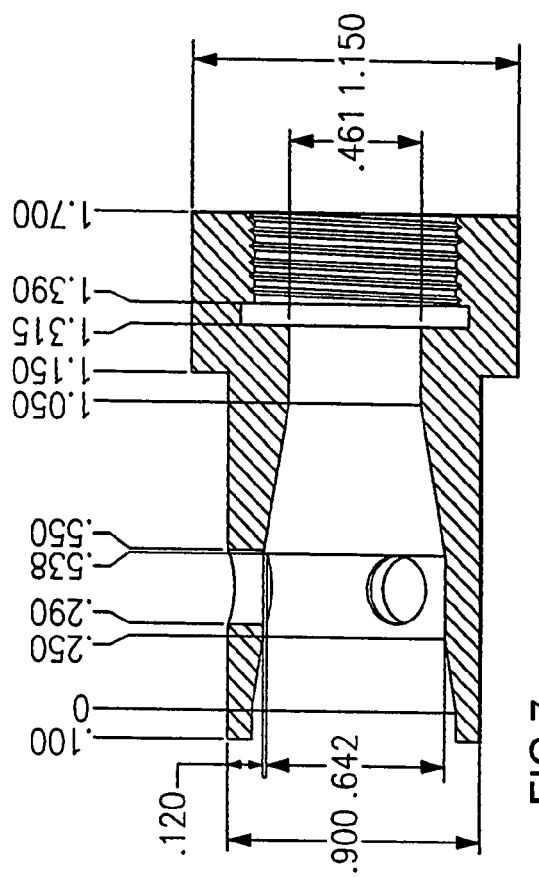
FIG.7 SECTION A-A
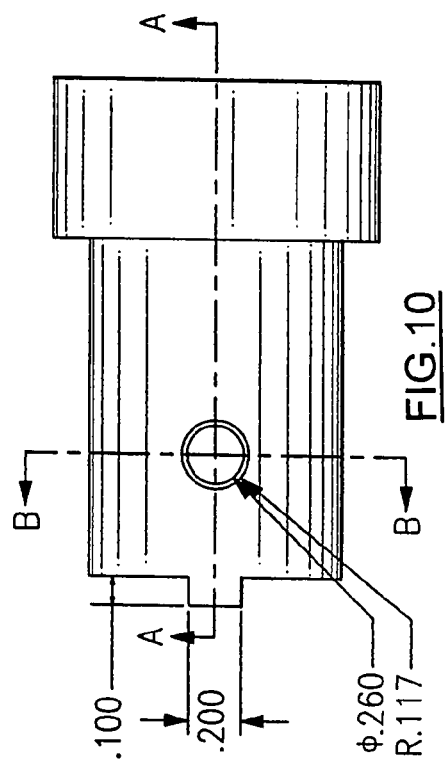
FIG.10

SECTION A-A

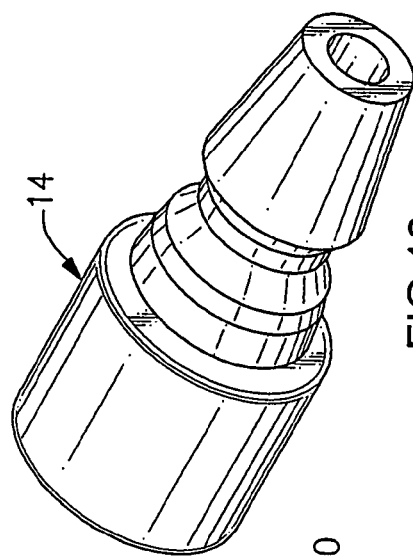
FIG. 17
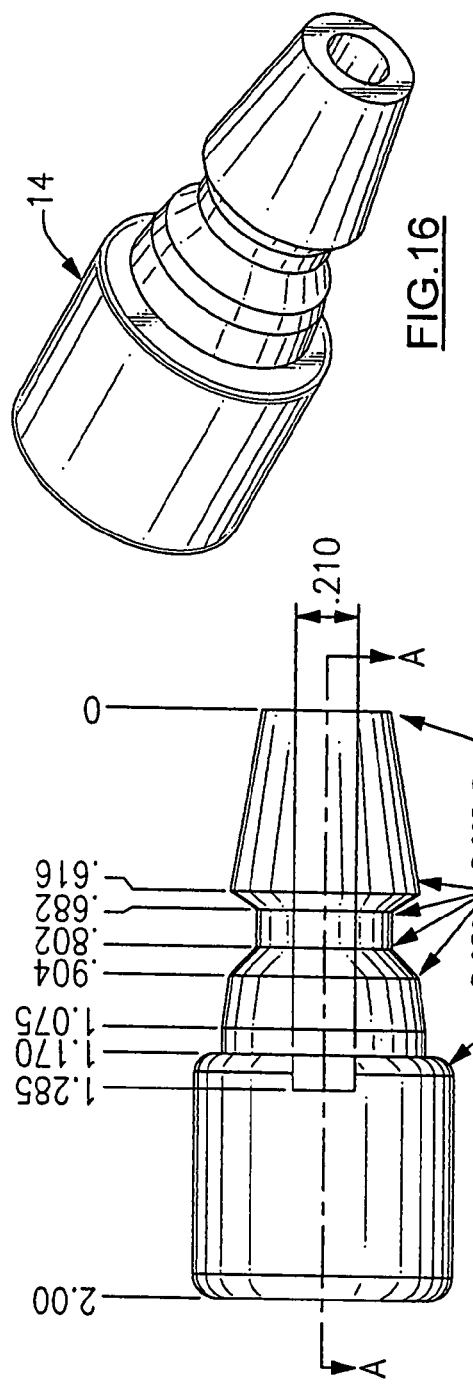
FIG. 16
FIG. 15
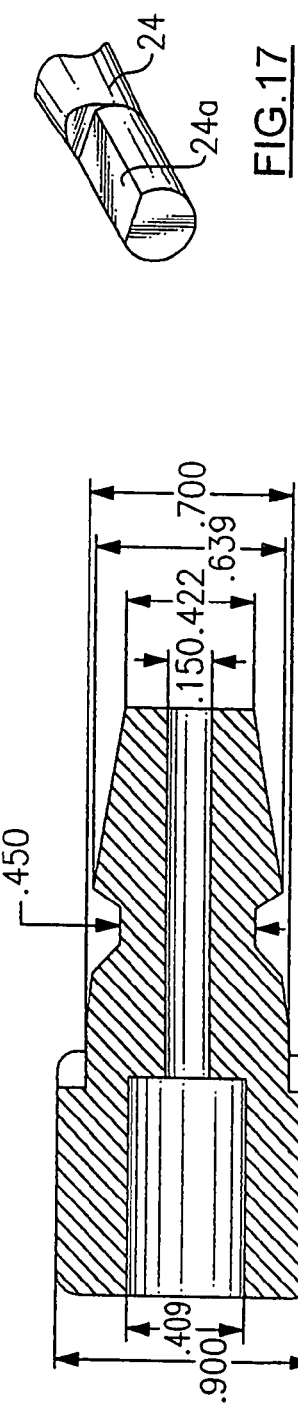
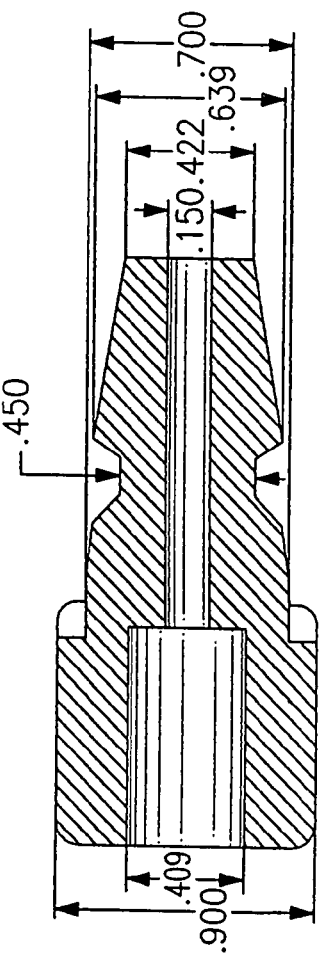
SECTION A-A
FIG. 18

QUICK-RELEASE TOOL HOLDER FOR ROTARY TOOLS

BACKGROUND OF THE INVENTION

1. Field of the Invention

The present invention, in general, relates to milling machines and lathes and, more particularly, to a quick-release tool holder for rapidly changing tool bits and cutters.

Those skilled in the art of using milling machines and lathes know about changing tools. The terms "tool" or "tool bits" as used herein is intended to apply to any type of a rotary tool that actually contacts the work-piece and removes material from it. Drill, grinding, and cutting bits are included and are benefited by the instant invention.

The term, "rotary tools" is intended to include any tool that rotates the tool bit or work-piece and allows contact of the tool bit with the work-piece. Milling machines and lathes are examples of rotary tools.

It is often necessary to frequently change tool bits. This is time-consuming. It is also necessary for any device that expedites the process to securely hold the tool bit in a repeatable position; else inaccuracies and non-repeatability will occur. This is true for many numerically controlled (i.e., computer controlled) milling machines and other types of rotary machines (i.e., lathes, etc.) that are programmed to perform a repetitive operation on a plurality of work-pieces.

The tool bit must be centered by any tool holder. The tool holder must also be able to transmit a great deal of torque to the actual tool bit, as the tool bit contacts the work-piece.

These needs are true for a variety of rotary tools, including lathes and milling machines. A smaller class of milling machines experiences frequent tool bit changes and would especially benefit from such a device.

Accordingly, there exists today a need for a quick-release tool holder for rotary tools that helps ameliorate the aforementioned difficulties.

Clearly, such an apparatus would be a useful and desirable device.

2. Description of Prior Art

Tool holders are, in general, known. Prior art tool holders do not adequately center each successive tool bit. Some devices introduce an offset mass in the tool holder that causes vibration during rotation of the tool bit, or which may snag on an operator's clothing. Also, prior devices do not adequately remove slack and so the actual tool bit is not held with sufficient rigidity.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a quick-release tool holder for rotary tools that is easy to use.

It is also an important object of the invention to provide a quick-release tool holder for rotary tools that is safe to use.

Another object of the invention is to provide a quick-release tool holder for rotary tools that permits quick changing of a tool bit.

Still another object of the invention is to provide a quick-release tool holder for rotary tools that automatically centers a tool bit in the rotary tool.

Still yet another object of the invention is to provide a quick-release tool holder for rotary tools that can transmit as much torque as is desired to a tool bit.

Yet another important object of the invention is to provide a quick-release tool holder for rotary tools that includes a tang for transmitting torque from a first half of the tool holder to a second half of the tool holder.

Still yet another important object of the invention is to provide a quick-release tool holder for rotary tools that includes a longitudinal motion of a portion of a first portion of a tool holder in a first direction to release a second portion of the tool holder apart from the first portion of the tool holder.

A first continuing object of the invention is to provide a quick-release tool holder for rotary tools that includes a longitudinal motion of a portion of a first portion of a tool holder in a second direction to permit insertion of a second portion of the tool holder into the first portion of the tool holder.

A second continuing object of the invention is to provide a quick-release tool holder for rotary tools that includes a longitudinal motion of a portion of a first portion of a tool holder in a second direction to permit insertion of a second portion of the tool holder into the first portion of the tool holder and which includes a longitudinal motion of the portion of the first part in a first direction to secure the second portion of the tool holder to the first portion of the tool holder.

A third continuing object of the invention is to provide a quick-release tool holder for rotary tools that automatically centers a second portion of a tool holder with respect to a first portion and which automatically takes up slack between the two.

Briefly, a quick-release tool holder for rotary tools that is constructed in accordance with the principles of the present invention has a first portion of the tool holder that includes an assembly that is attached to the rotary tool. The first portion includes a slide that moves a predetermined distance along a longitudinal length of the tool holder in a first direction sufficient to permit release of a second portion of the tool holder apart from the first portion. Alternately, to insert the second portion of the tool holder into the first portion, the slide is also moved in the first direction a sufficient amount to permit insertion of the second portion into the first part. A pair of tangs disposed on either the first or on the second portion engages with a pair of recesses in the opposite portion and is used to transmit torque from the first portion to the second portion. The slide is then urged in an opposite second direction during which the second portion is secured to the first portion, centered, and any slack between the two is automatically removed a sufficient amount.

BRIEF DESCRIPTION OF THE DRAWINGS

FIG. 7 is a cross-sectional view along a longitudinal length of a master of a first portion of a quick release tool holder of FIG. 1.

FIG. 8 is a view in perspective of a first portion of a quick release tool holder of FIG. 1.

FIG. 9 is a cross-sectional view along the line B-B of the first portion of a quick release tool holder of FIG. 10.

FIG. 10 is a side view of a first portion of a quick release tool holder of FIG. 1.

FIG. 15 is a side view taken of a second portion of a quick release tool holder of FIG. 1.

FIG. 16 is a view in perspective of a second portion of a quick release tool holder of FIG. 1.

FIG. 17 is a view in perspective of a D-shaped end of a tool bit for attachment to a second portion of a quick release tool holder of FIG. 1.

FIG. 18 is a cross-sectional view taken along the line A-A of FIG. 15 of a second portion of a quick release tool holder of FIG. 1.

DETAILED DESCRIPTION OF THE INVENTION

Figure 1:
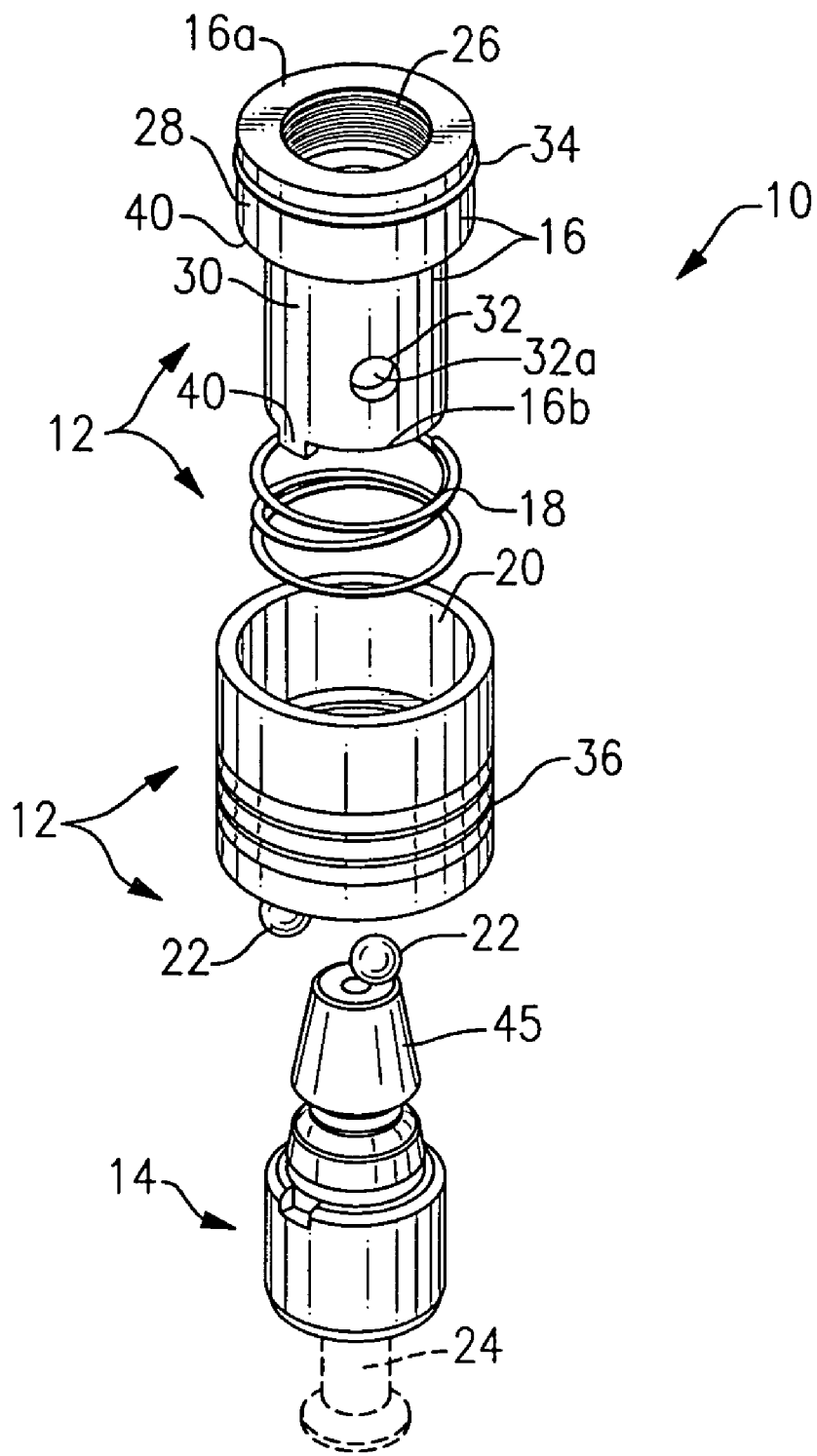
FIG. 1 is an exploded view, in perspective, of a normal drive type of a quick-release tool holder for rotary tools.

Referring to all of the drawings and appendices on occasion, and now in particular to FIG. 1 is shown, a quick-release tool holder for rotary tools, identified in general by the reference numeral 10.

The tool holder 10 includes a first portion, identified in general by the reference numeral 12 and a detachable second portion, identified in general by the reference numeral 14.

The first portion 12 is an assembly that includes a master 16, spring 18, slide 20, and a plurality of balls 22.

The second portion 14 is intended to secure a tool bit 24 thereto, the tool bit 24 shown in dashed lines. The tool bit 24 includes any type of size of cutting tool or end mill, etc., as is desired. The tool bit 24 is attached by a set screw 15 (FIG. 3) that passes through a threaded opening provided in the second portion 14 and bears against the tool bit 24. Normally, the tool bit 24 includes a flat side that the set screw 15 bears against.

The tool bit 24 is inserted fully into a corresponding opening 25 that is provided at a first end 14a of the second portion 14. The corresponding opening 25 includes a shape, preferably, that matches that of an upper end of the tool bit 24, in cross-section. Normally, this shape includes a "D-shape" cross-section, as is well known in the tool bit 24 arts.

The corresponding opening 25 terminates at a top thereof inside the second portion at a smaller diameter second opening 25a that extends all the way through the second portion 14. Accordingly, a longitudinal length of the second portion 14 is open from the first end 14a of the second portion 14 to an opposite second end 14b thereof.

This provides certain benefits that permit easier insertion or removal of the tool bit 24 there-from, for example, not increasing air pressure in the corresponding opening 25 that would make full insertion of the tool bit 24 therein difficult to accomplish.

If desired, the tool bit 24 can be secured to the second portion by any preferred method, for example by a threaded-type of attachment, adhesive, welding, or by any other preferred method. The second portion 14 can be sold with or without the tool bit 24 attached thereto.

Referring now also to the remaining drawing figures, is shown the master 16, which includes inside threads 26 disposed at a first end 16a thereof. The inside threads 26 are for direct attachment of the master 16 to a rotary tool, not shown, in a well-known way. The rotary tool includes any preferred type of drill, lathe, or milling machine. Once attached to the rotary tool, the master 16 is not normally changed or removed.

The master 16 includes a larger outside diameter upper portion 28 and a smaller outside diameter lower portion 30. The smaller inside portion includes three equally spaced openings 32 that are disposed the same distance from the first end 16a.

Each of the openings 32 includes a larger inside diameter upper portion and a smaller diameter inside lower lip 32a. The larger diameter upper portion of the opening 32 permits a corresponding one of the balls 22 to pass freely into and along a longitudinal length of the opening 32 from the outside of the master 16, but to not pass all the way through the opening 32. The lower lip 32a retains the ball 22 and prevents it from passing through the master 16 and being lost when the second portion 14 is absent from the first portion 12.

An odd number of balls 22 and openings 32 with three of each being the minimum are preferred to automatically center the second portion 14, when it is engaged, inside of the first portion 12.

A retaining ring 34 fits into a circular recess in the master 16 proximate the first end 16a thereof.

Figure 3:
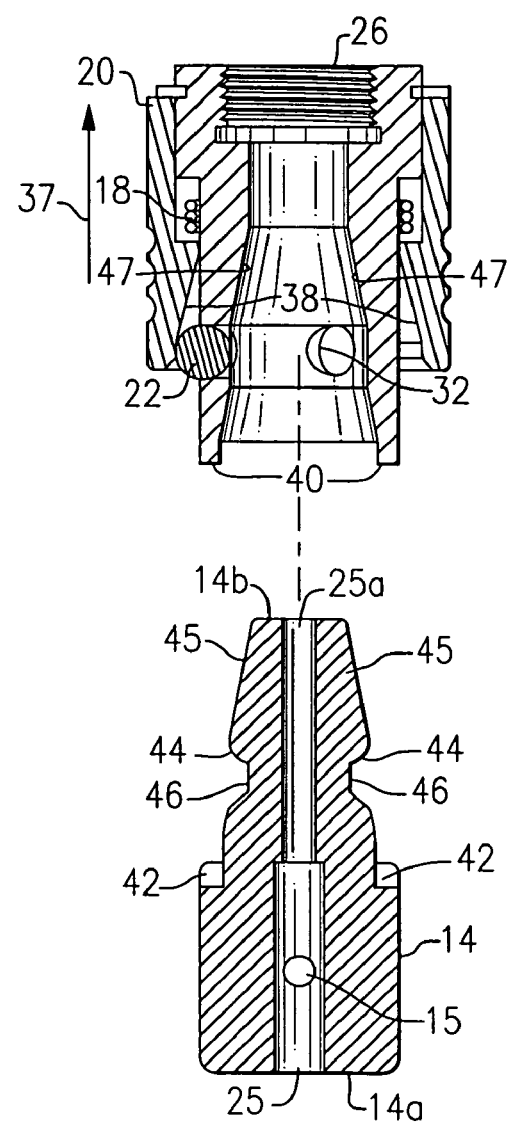
FIG. 3 is a cross sectional view of the normal drive type of a quick-release tool holder of FIG. 2 taken along the line 3-3 of FIG. 2.

The slide 20 includes a plurality of outer bands 36 that increase friction and allow it to be securely grasped and urged in a first direction, as shown by arrow 37 (FIG. 3). Of course, other methods to increase friction may be used or, if preferred, no additional method of increasing friction need be included.

Referring still to FIG. 3, a cross-sectional view, the slide 20 includes an inside conical taper 38 with a smaller diameter thereof disposed closer toward the first end of the master 16, when the slide 20 is assembled thereto.

To assemble the tool holder 10, the spring 18, which is a coil spring, is disposed over the lower portion 30 of the master 16. The slide 20 is then urged over the lower portion 30 in the direction of arrow 37 until the spring 18 is fully compressed against a ridge 30 of the master 16.

One each of the balls 22 is then placed in each of the openings 32. The slide 20 is then released and is urged in a direction opposite that as shown by arrow 37 by the spring 18. The taper 38 urges each ball 22 fully down into the opening 32 until it is stopped by the lower lip 32a. This, in turn, stops further movement by the slide 20 in the direction that is opposite that as shown by arrow 37.

Figure 2:
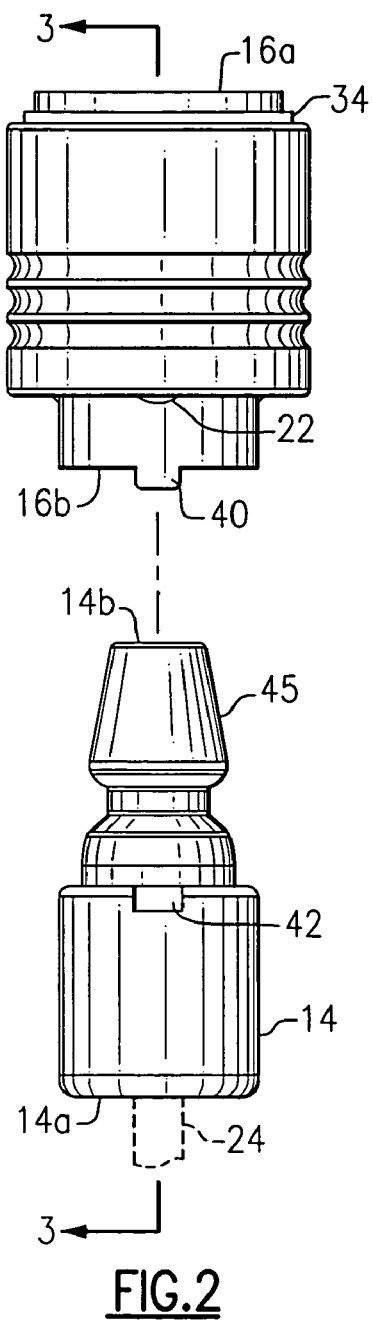
FIG. 2 is a side view of the normal drive type of a quick-release tool holder of FIG. 1 with a first portion and a second portion in a spaced-apart relationship.

The slide 20, spring 18, and balls 22 are retained in position as an assembly that can only be disassembled if the slide 20 is urged sufficiently far in the direction as shown by arrow 37 to permit removal of the balls 22 from the openings 32. To prevent this from happening, the retaining ring 34 is secured to the master 16. FIG. 2 and FIG. 3 show how the retaining ring 34 limits movement of the slide 20 in the direction as shown by arrow 37.

Using the threads 26, the master 16 is then threaded onto a driven rotating member of the rotary tool (not shown) that rotates the master 16 when the rotary tool is turned on. Obviously, a work-piece (not shown) is disposed proximate the tool bit 24 and is secured in position to the rotary tool as is well known in the machine arts.

The master 16 includes a pair of tangs 40 that extend away from the first end 16a. The tangs 40 are intended to engage with corresponding recesses 42 in the second portion 14 and are used to supply torque to the second portion 14. As many or as few of the tangs 40 and the recesses 42, as desired, are included. Certain versions of the tool holder 10 will handle larger or smaller tool bits 24 and will therefore experience a range of torque forces. The tangs 40 and recesses 42 allow for easy design flexibility in this regard.

To quickly insert the second portion 14 and tool bit 24 into the master 16, the slide 20 is urged along a longitudinal axis of the master 16 in the direction of arrow 37 as far as it can go until it contacts the retainer ring 34. The second end 14b of the second portion 14 is then inserted into an opening at an opposite second end 16b of the master 16 along a center longitudinal axis of the master 16 as far as it will go toward the threads 26. An upper conical taper 45 of the second portion 14 that is proximate the second end 14b thereof, urges the balls 22 outward toward the slide 20 sufficient to permit the second portion 14 to fully enter into the master 16.

The upper conical taper 45 of the second portion 14 is carefully machined to match that of an inside taper 47 of the master 16. The second portion 14 is inserted into the master 16 until the upper conical taper 45 bears against the inside taper 47.

Figure 4:
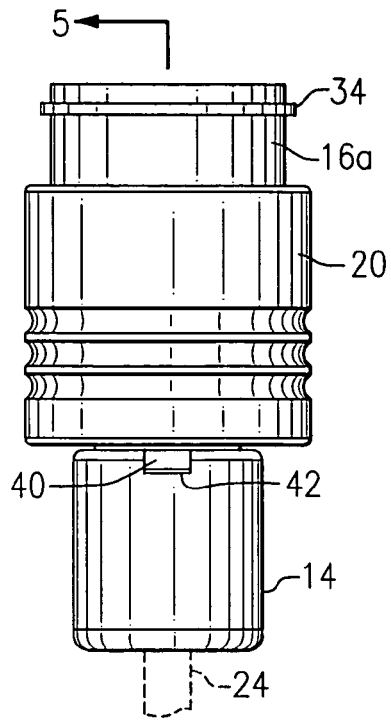
FIG. 4 is a side view of the normal drive type of a quick-release tool holder of FIG. 1 with a first portion engaged with a second portion.
Figure 5:
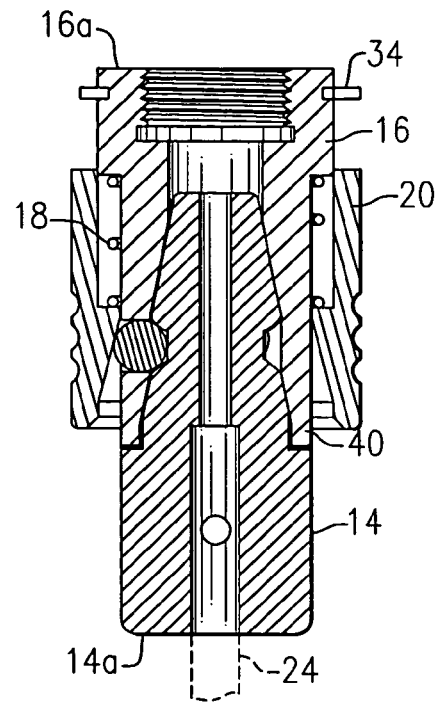
FIG. 5 is a cross sectional view of the normal drive type of a quick-release tool holder of FIG. 4 taken along the line 5-5 of FIG. 4.

Referring now also to FIG. 4 and to FIG. 5, the slide 20 is then released while continuing to retain the second portion 14 in a fully inserted position, up and fully in contact with the master 16. The spring 18 then urges the slide 20 toward the second end 16b of the master 16 which forces the balls 22 to enter into the openings 32 until the balls 22, which are forced inward by the inside conical taper 38 of the master 16, contact an upper edge 44 of a circular recess 46 that is provided around an outer circumference of the second portion 14.

Because the balls 22 bear against the upper edge 44, they exert a force that retains the upper conical taper 45 of the second portion 14 in direct contact with the inside taper 47. This removes slack between the first portion 12 and the second portion 14.

Accordingly, different second portions (not shown) that include various different tool bits (not shown) can be substituted for the second portion 14 (and for the tool bit 24) while ensuring that a center longitudinal axis of each different tool bit will be in alignment with that of the tool bit 24 and that of the second portion 14 and that of the first portion 12.

Where it not for the tangs 40 and recesses 42, the second portion 14 could rotate about its center longitudinal axis with respect to the first portion 12. However, when the second portion 14 is inserted into the first portion 12, it is rotated about its center longitudinal axis an amount sufficient to ensure that the tangs 40 enter into the recesses 42.

This alignment must be accomplished to secure the second portion 14 to the first portion 12. Otherwise, the second portion 14 cannot be fully inserted into the first portion 12. If the second portion 14 is not fully inserted into the first portion 12 it is impossible for the balls 22 to engage in (i.e., enter) the circular recess 46.

Instead, the balls 22 will bear against a portion of the upper conical taper 45 which in turn, will block and thereby prevent the slide 20 from being adequately displaced in a direction opposite that of arrow 37. Consequently, unless the tangs 40 are required to engage with the recesses 42, the second portion 14 will not engage with the first portion 12 and the second portion 14 will be free to move in a direction opposite that of arrow 37 with respect to the first portion 12.

To release the second portion 14 and the tool bit 24 from the master 16, the slide 20 is urged in the direction of arrow 37 until it contacts the retainer ring 34. The second portion 14 is then released and is able to be urged in a direction opposite to arrow 37. As desired, the different second portion with a different tool bit attached thereto is quickly attached in the manner described hereinabove.

Accordingly, a way to quickly change tool bits is provided that ensures that the center longitudinal axes of the tool bit 24, second portion 14, master 16 and driven portion of the rotary tool are in alignment. A quick-change capability is provided in which slack is minimized to nearly zero. Furthermore, any desired amount of torque can be transmitted to the tool bit 24.

Figure 6:
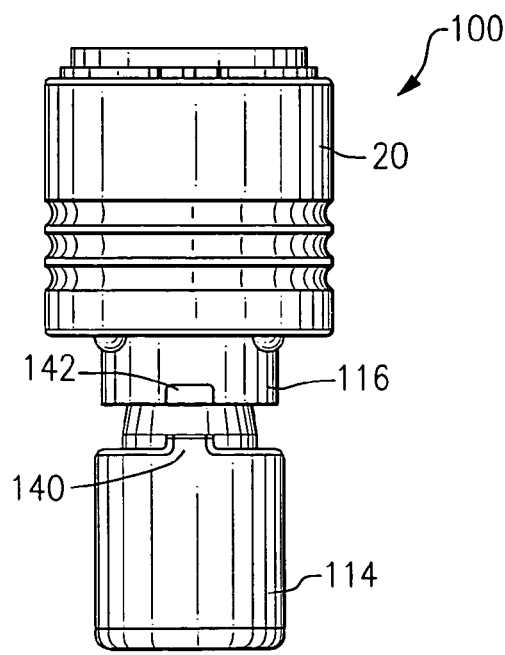
FIG. 6 is a side view of a modified drive type of a quick-release tool holder.
Figure 12:
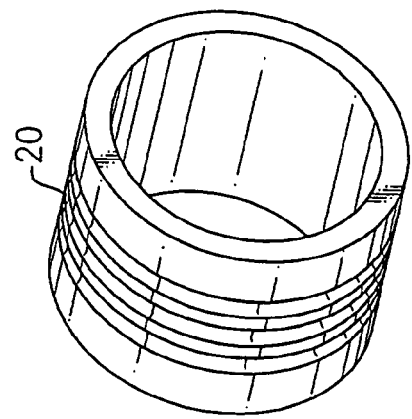
FIG. 12 is a view in perspective of a slide of a first portion of a quick release tool holder of FIG. 1.
Figure 13:
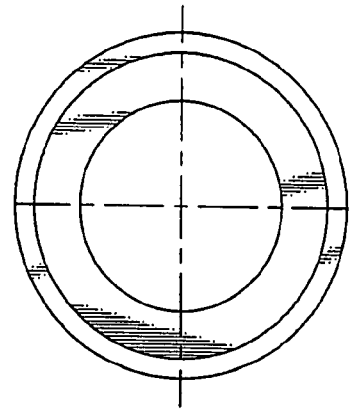
FIG. 13 is an end view of the slide of the first portion of a quick release tool holder of FIG. 14.
Figure 11:
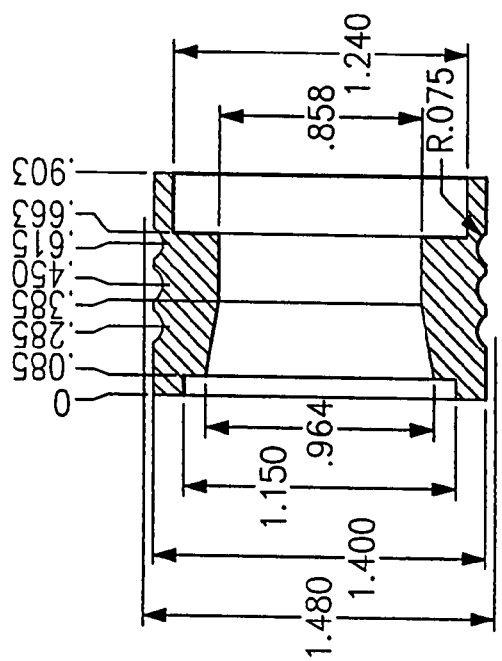
FIG. 11 is a cross-sectional view taken along the line A-A of FIG. 14 of a slide of a first portion of a quick release tool holder of FIG. 1.
Figure 14:
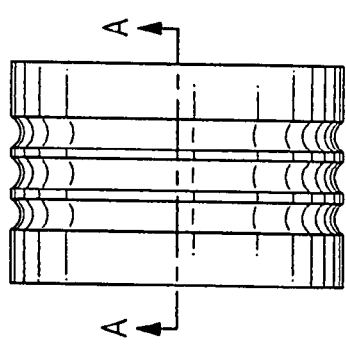
FIG. 14 is a side view of a slide of a first portion of a quick release tool holder of FIG. 1.

Referring now to FIG. 6, is shown, a modified quick-release tool holder for rotary tools, identified in general by the reference numeral 100.

The modified tool holder 100 includes a modified master 116 and a modified second portion 114, shown in a slightly spaced-apart orientation. A modified pair of tangs 140 is provided on the modified second portion 114 and a modified pair of recesses 142 is provided in the modified master 116. The remainder of the modified tool holder 100 is substantially identical to that of the tool holder 10.

The modified tool holder 100 illustrates that it is, of course, possible to switch position of the modified tangs 140 and the modified recesses 142 are compared to where they are disposed on the tool holder 10.

The inside threads 26 of the master 16 are machined therein to match outside threads (not shown) of the driven member of the rotary tool and can, of course, vary accordingly. If desired, the inside threads 26 can be eliminated and the first end 16a of the master 16 modified, as desired, to engage with whatever configuration is possessed by the driven member of the rotary tool.

APPENDICES A, B, and C, show perspective and other views, including detailed dimensions of the master 16, slide 20, and second portion 14, respectively, for a particular configuration of the tool holder for rotary tools 10.

APPENDIX C also shows a portion of the tool bit 24 including a D-shape 24a of an upper portion thereof that is adapted to enter into the corresponding opening 25 that is provided at a first end 14a of the second portion 14. The corresponding opening 25 preferably includes the same D-shape 24a and is used to transmit torque from the second portion 14 to the tool bit 24. The set screw 15 is used, preferably, only to hold the tool bit 24 along its longitudinal length in the corresponding opening 25.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A quick-release tool holder for rotary tools, comprising:
   (a) a first portion, including means for attaching a first end of said first portion to a driven member of said rotary tool that includes a threaded connection;
   (b) a second portion and wherein said first portion includes a master member and a slide that is concentrically disposed over said master member; means for detachably-attaching said second portion to said first portion, wherein said means for detachably-attaching said second portion to said first portion operates by the urging of a user of said concentric slide of said first portion along a center longitudinal axis of said first portion toward said rotary tool an amount sufficient to permit an attachment of said second portion to said first portion to occur and wherein said urging of said concentric slide occurs without a need for any rotation about said center longitudinal axis of said slide with respect to said master member;
   wherein said master member includes a larger diameter upper portion and a smaller diameter lower portion and a spring that is disposed over a portion of said lower portion and wherein said master member includes a plurality of openings that pass through said lower portion and wherein each of said openings permits a ball to pass into a corresponding one of said openings a predetermined distance and wherein said ball is not able to pass all the way through said corresponding one of said openings, and wherein said slide is adapted to be urged in a direction generally toward said rotary power tool an amount sufficient to compress a portion of said spring, and wherein said slide includes a taper and wherein when said slide is urged sufficiently far toward said rotary power tool, said balls are adapted to be urged maximally out of each of said openings an amount sufficient to permit an upper conical taper of said second portion to enter into a bottom of said master member until said upper conical taper bears against an inside taper of said master member; and
   including means for transmitting torque from said driven member of said rotary tool to said first portion and to said second portion.

2. The quick-release tool holder of claim 1 including means for attaching a tool bit to said second portion.

3. The quick-release tool holder of claim 2 wherein said means for attaching a tool bit includes a corresponding opening in said second portion that is adapted to receive a portion of said tool bit therein and means for securing said tool bit in said corresponding opening.

4. The quick-release tool holder of claim 3 wherein said portion of said tool bit includes a D-shape in cross-section and wherein said corresponding opening includes a corresponding D-shape.

5. The quick-release tool holder of claim 1 wherein said means for transmitting torque transmits torque to a tool bit that is disposed in said second portion.

6. The quick-release tool holder of claim 1 wherein said means for attaching a first end of said first portion to a driven member of said rotary tool includes inside threads disposed at said first end of said first portion.

7. The quick-release tool holder of claim 1 wherein a circular recess is provided around a circumference of said second portion and wherein said circular recess of said second portion includes an upper edge and wherein when said slide is released, said slide is urged by said spring away from said rotary power tool an amount sufficient to urge each of said balls into said corresponding opening and to contact said upper edge an amount sufficient to apply a force to retain said upper conical taper against said inside taper of said master member.

8. The quick-release tool holder of claim 1 wherein said means for transmitting torque includes at least one tang in said first portion and at least one corresponding recess in said second portion wherein said at least one tang is adapted to enter and engage with said at least one corresponding recess sufficient to transmit torque from said first portion to said second portion.

9. The quick-release tool holder of claim 1 wherein said means for transmitting torque includes at least one tang in said second portion and at least one corresponding recess in said first portion wherein said tang is adapted to enter and engage with said recess sufficient to transmit torque from said first portion to said second portion.

* * * * *